(12) United States Patent
Nobe et al.

(10) Patent No.: US 7,518,765 B2
(45) Date of Patent: Apr. 14, 2009

(54) IMAGE READING APPARATUS AND MULTI-FUNCTIONAL APPARATUS HAVING GROUNDED PRESSING PLATE

(75) Inventors: Hiroshi Nobe, Nagoya (JP); Atsushi Hayakawa, Okazaki (JP)

(73) Assignee: Brother Kogyo Kabushiki Kaisha, Tokyo (JP)

( * ) Notice: Subject to any disclaimer, the term of this patent is extended or adjusted under 35 U.S.C. 154(b) by 753 days.

(21) Appl. No.: 10/930,807

(22) Filed: Sep. 1, 2004

(65) Prior Publication Data
US 2005/0046912 A1    Mar. 3, 2005

(30) Foreign Application Priority Data
Sep. 2, 2003    (JP) .............................. 2003-310690

(51) Int. Cl.
*H04N 1/04*    (2006.01)
(52) U.S. Cl. ........................ 358/486; 358/474; 358/471; 358/498
(58) Field of Classification Search ................. 358/486, 358/474, 471, 400, 498, 1.1; 361/809, 807, 361/679, 600; 271/10.11, 10.09, 10.01, 8.1, 271/121, 109, 18; 267/71, 70, 69; 439/497
See application file for complete search history.

(56) References Cited

U.S. PATENT DOCUMENTS

| | | | | |
|---|---|---|---|---|
| 4,625,097 | A | * | 11/1986 | Miwa ......................... 219/441 |
| 5,764,384 | A | * | 6/1998 | Wilcox et al. ............... 358/498 |
| 5,921,888 | A | * | 7/1999 | Park ........................... 477/131 |
| 6,178,274 | B1 | | 1/2001 | Youda et al. |
| 6,349,155 | B1 | | 2/2002 | Youda et al. |
| 6,416,297 | B1 | * | 7/2002 | Kawaguchi et al. ....... 417/222.2 |
| 2002/0039207 | A1 | * | 4/2002 | Kanda ........................ 358/498 |
| 2003/0034871 | A1 | * | 2/2003 | Cheng ......................... 337/59 |
| 2003/0142370 | A1 | * | 7/2003 | Hanashi et al. ............. 358/474 |

FOREIGN PATENT DOCUMENTS

| | | |
|---|---|---|
| JP | A 5-63926 | 3/1993 |
| JP | A 10-112771 | 4/1998 |
| JP | A-10-177224 | 6/1998 |
| JP | A 2000-294943 | 10/2000 |
| JP | A 2001-217988 | 8/2001 |
| JP | A-2002-125091 | 4/2002 |

* cited by examiner

*Primary Examiner*—Houshang Safaipour
(74) *Attorney, Agent, or Firm*—Oliff & Berridge, PLC (57) ABSTRACT

An image reading apparatus includes a transport path through which a medium to be read is transported, an image reading section disposed in a middle of the transport path and reading an image formed on the medium to be read that is transported along the transport path, a cover member that covers the image reading section and the transport path, a pressing member in which another end is supported by the cover member to cause one end to be swingable, thereby pressing the transported medium to be read against the image reading section, a circuit board member which is disposed on the cover member, and on which a grounded electric circuit is formed, and a conductive member which electrically connects the pressing member to the electric circuit formed on the circuit board member to ground the pressing member through the electric circuit.

14 Claims, 4 Drawing Sheets

IMAGE READING APPARATUS AND MULTI-FUNCTIONAL APPARATUS HAVING GROUNDED PRESSING PLATE

BACKGROUND OF THE INVENTION

1. Field of the Invention

The present invention relates to an image reading apparatus in which a pressing plate can be discharged, and also to a multi-functional apparatus having such an image reading apparatus.

2. Description of the Related Art

Recently, a multi-functional apparatus having an image reading apparatus, an image forming apparatus, a facsimile apparatus, and the like is widely used. In such a multi-functional apparatus, in order to further reduce the cost, the number of parts is reduced, or more economical parts are used. While realizing a low production cost, it is intended to enhance the performance to be equal to or higher than that of the conventional art.

In an image reading apparatus mounted on a multi-functional apparatus, for example, an expensive CCD image sensor is not used in an operation of reading an original serving as a medium to be read, and the reading operation is conducted with using a contact image sensor (hereinafter, abbreviated to "CIS") which is more economical. A CIS has a shallower depth of field than a CCD image sensor. In order to read an image without blurring, therefore, an original must be in close contact with a CIS. In an image reading apparatus, consequently, a pressing plate for urging an original against a CIS placed in a transport path through which the original is transported is disposed, and the original passing over the CIS is pressed against the CIS by the pressing plate, whereby close contact between the CIS and the original is realized.

Such a pressing plate is formed of a sheet metal or the like in order to ensure the strength of enabling the movement. In the pressing plate, a white sheet made of polycarbonate, vinyl chloride, or the like is bonded to a portion which is opposed to the CIS. The white sheet is used as a reference of the reading brightness for the CIS. During the process of reading an original, the white sheet always butts against the original, and therefore is easily charged by friction with the original. In JP-A-2001-217988, a movable pressing plate (original pressing means) is always set to a contacting state by a white ground compression spring, and the white ground compression spring is connected to a ground line through plate springs and the like to be grounded, thereby discharging the pressing plate.

SUMMARY OF THE INVENTION

In JP-A-2001-217988, the white ground compression spring for discharging the pressing plate is connected to the ground line through the plural plate springs and other components, the plate springs and the ground line are fixed by screws, and the ground line is disposed for discharging the pressing plate. Therefore, the number of parts is increased, whereby the production process is complicated, and the production cost is increased.

The invention has been made to solve the problems. An image reading apparatus and a multi-functional apparatus having such an image reading apparatus are disclosed herein, in which a pressing plate is grounded through an electric circuit formed on a circuit board member, so that the production process can be simplified and the production cost can be lowered.

According to an aspect of the invention, there is provided an image reading apparatus including: a transport path through which a medium to be read is transported; an image reading section disposed in a middle of the transport path and reading an image formed on the medium to be read that is transported along the transport path; a cover member that covers the image reading section and the transport path; a pressing member in which another end is supported by the cover member to cause one end to be swingable, thereby pressing the transported medium to be read against the image reading section; a circuit board member which is disposed on the cover member, and on which a grounded electric circuit is formed; and a conductive member that electrically connects the pressing member to the electric circuit formed on the circuit board member to ground the pressing member through the electric circuit.

In this image reading apparatus, the pressing member can be grounded through the electric circuit of the circuit board member. Even when the pressing member is charged as a result of sliding contact with the medium to be read, therefore, the charges can be eliminated by the simple structure.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
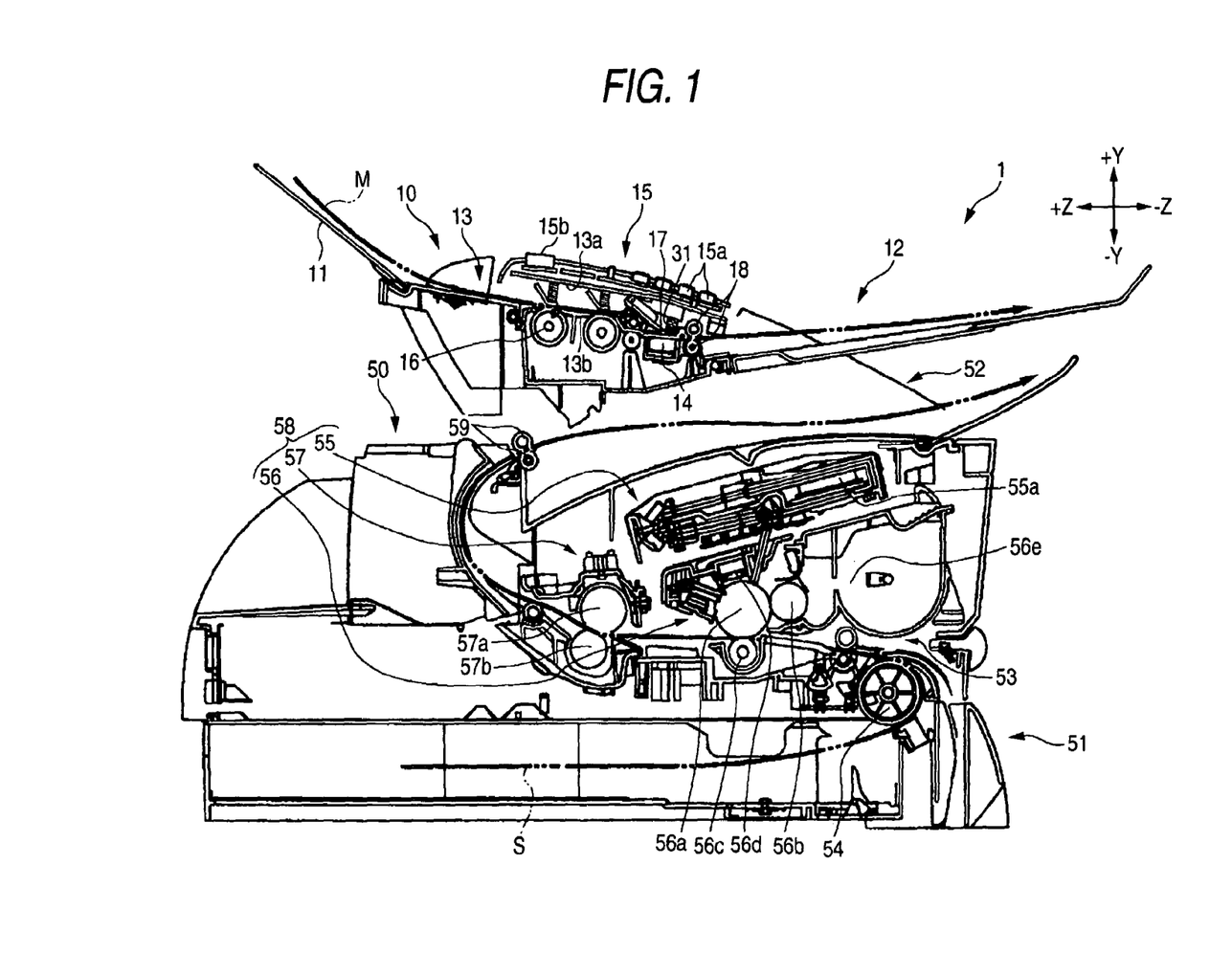
FIG. 1 is a central sectional view of a multi-functional apparatus.

Hereinafter, an embodiment of an image reading apparatus and a multi-functional apparatus having such an image reading apparatus in which the invention is embodied will be described with reference to the accompanying drawings. Referring to FIG. 1, first, the whole configuration of a multi-functional apparatus 1 will be described. FIG. 1 is a central sectional view of the apparatus 1. Hereinafter, the directions of −Z, +Z, +Y, −Y, +X, and −X are referred to as the front direction, the back direction, the upper direction, the bottom direction, the right side direction, and the left side direction, respectively.

As shown in FIG. 1, the apparatus 1 has a configuration in which an image reading apparatus 10 for reading an image formed on a medium to be read is placed in an upper portion in the sectional view, and an image forming apparatus 50 for forming an image on a medium to be recorded is placed in a lower portion. The apparatus 1 has: a scanner function due to the image reading apparatus 10; a printer function due to the image forming apparatus 50; and a copying function which is conducted by printing an image of an original read by the image reading apparatus 10 on a sheet by the image forming apparatus 50. The apparatus 1 further has a facsimile function which is not shown, and a modem, an NCU, and the like which are known and not shown, and which are used for transmitting an image read by the image reading apparatus 10 as FAX data to a terminal apparatus in a communication destination via a public communication network. The image forming apparatus 50 can print an image based on FAX data received from a terminal apparatus in a communication destination.

The image forming apparatus 50 is configured as a so-called laser printer, which is known. In a substantially middle portion of the image forming apparatus 50, an image forming unit 58 which forms an image on a sheet serving as a medium to be recorded is disposed. A sheet supply cassette 51 which stackingly stores sheets is placed below the image forming unit 58, and a sheet discharge tray 52 onto which sheets bearing an image are discharged to be stackingly held. An S-like sheet transport path 53 is disposed in the image forming apparatus 50 so that a sheet picked up from the sheet supply cassette 51 is passed through the image forming unit 58, an image is formed on the sheet, and the sheet is then discharged onto the sheet discharge tray 52 (in the figure, the sheet transport path is indicated by the two-dot chain line S).

The sheet supply cassette 51 is attached to a bottom portion of the apparatus 1 so as to be attachable and detachable from the side of the front direction of the apparatus 1. A sheet supply roller 54 which feeds a sheet held in the sheet supply cassette 51 to the transport path 53 is disposed in the front face side of the apparatus 1 and above the sheet supply cassette 51. When a printing process is to be conducted, the sheet supply roller 54 picks up a sheet and then feeds the sheet in the front direction of the apparatus 1. In the vicinity of the sheet supply roller 54, the transport path 53 is formed into a U-like shape so that the sheet guided by the transport path 53 is directed toward the back face of the apparatus 1.

The image forming apparatus 50 is configured by: a laser unit 55 which emits a laser beam; a process unit 56 which forms a developer image by a developer such as a toner on the basis of the laser beam emitted from the laser unit 55 and which transfers the image onto the sheet; and a fixing unit 57 which fixes the image formed on the sheet by the process unit 56, onto the sheet.

In the laser unit 55, the laser beam emitted from a laser beam generating section which is not shown is scanned on the basis of print data in the main scanning direction (the direction perpendicular to the sheet transportation direction) by a rotated polygon mirror 55a, and the laser beam is transmitted or reflected by plural lenses and mirrors to exposure scan the surface of a photosensitive drum 56a of the process unit 56.

In the process unit 56, the photosensitive drum 56a, a developing roller 56b, a transfer roller 56c, a charging device 56d, and the like are disposed. The photosensitive drum 56a is a drum on the surface of which an invisible electrostatic latent image is formed by a potential difference. The surface of the photosensitive drum 56a is positively charged to a high potential (for example, +1,000V) by the charging device 56d which is disposed upstream in the rotational direction. The laser beam from the laser unit 55 illuminates the surface. In only the portion illuminated with the laser beam, the surface potential is lowered (for example, +100V). As a result, an electrostatic latent image is formed by high-potential and low-potential portions.

The developing roller 56b is disposed downstream in the rotational direction from the position of the photosensitive drum 56a which is exposed to the laser beam, charges a positively chargeable toner housed in a toner box 56e, and then supplies the charged toner to the photosensitive drum 56a on which the electrostatic latent image is formed. The developing roller 56b charges the toner to a potential (for example, +400 V) which is between the high and low potentials on the surface of the photosensitive drum 56a. At the position where the developing roller 56b is close to the photosensitive drum 56a, the toner carried by the developing roller 56b is selectively transferred to the low-potential portion of the photosensitive drum 56a.

The transfer roller 56c is placed downstream in the rotational direction of the photosensitive drum 56a from the developing roller 56b. A nip portion between the transfer roller and the photosensitive drum 56a is placed on the transport path 53 so that the sheet passes the portion. A bias is applied to the transfer roller 56c so that the potential of the roller is lower than that of the low-potential portion of the photosensitive drum 56a. Therefore, the developer image formed on the surface of the photosensitive drum 56a is electrostatically attracted by the transfer roller 56c from the rear side of the sheet passing the nip portion between the transfer roller and the photosensitive drum 56a, to be transferred onto the surface of the sheet.

The fixing unit 57 is configured by a heating roller 57a which gives heat of about 2.00 deg. to the sheet bearing a toner, thereby melting or softening the toner; and a pressure roller 57b which is urged so as to be pressed against the heating roller 57a. Anipportion between the heating roller 57a and the pressure roller 57b is placed on the transport path 53. When the sheet is passed through the nip portion, the toner on the sheet is heated and pressurized to be fixed to the sheet.

The transport path 53 is formed into a U-like shape in a position where the path has passed through the image forming unit 58, and guides the sheet to the sheet discharge tray 52 which is placed above the image forming unit 58. The sheet that is transported in the image forming unit 58 in the direction from the front face of the apparatus 1 to the back face is guided by the transport path 53 so that the transportation direction is directed to the front face of the apparatus 1, and then discharged onto the sheet discharge tray 52. A pair of sheet discharge rollers 59 are disposed in the tail end of the transport path 53, and the sheet is sent onto the sheet discharge tray 52 by the sheet discharge rollers 59.

A transport path 13 which transports an original serving as a medium to be read in a direction from the back face of the apparatus 1 to the front face is disposed inside the image reading apparatus 10 (in the figure, the original transport path is indicated by the two-dot chain line M). A CIS 14 which reads the intensity of reflected light of light emitted from a light source (not shown) toward the original, and which digitizes the read intensity is disposed in a bottom face 13b of the transport path 13. An original tray 11 which stackingly holds originals and supplies the originals to the transport path 13 is disposed at a start end in the transportation direction of the transport path 13. A discharge tray 12 which stackingly holds originals that have been subjected to the image reading process and discharged from the transport path 13 is disposed in the tail end of the transport path. The CIS 14 functions as an image reading section.

A supply roller 16 is disposed in the start end of the transport path 13. An original held on the original tray 11 is picked up by the supply roller 16 to be fed into the transport path 13. A pressing plate 17 is disposed above the CIS 14, and urged toward the CIS 14. When an original is passed above the CIS 14, the original is caused to be in close contact with the CIS 14 by the pressing plate 17, so that the CIS 14 having a shallow depth of field can stably read an image without blurring. The pressing plate 17 will be described later in detail. A pair of sheet discharge rollers 18 are disposed in the tail end of the transport path 13, and the original is sent onto the discharge tray 12. The pressing plate 17 functions as a pressing member.

An operation panel 15 through which the apparatus 1 is operated is disposed in an upper portion of the image reading apparatus 10. The operation panel 15 functions as a cover of the upper face of the transport path 13 to cover the transport path 13. When a failure occurs in transportation of an original, for example, the panel is swung about the rear end to open the front side, thereby enabling the transport path 13 to be exposed. In the operation panel 15, plural keys 15a through which the user instructs the operation of the apparatus 1, and an LCD 15b on which a menu, messages to the user, and the like are displayed are disposed. The operation panel 15 and an intermediate plate which will be described later function as a cover member, and the keys 15a function as a button.

Figure 2:
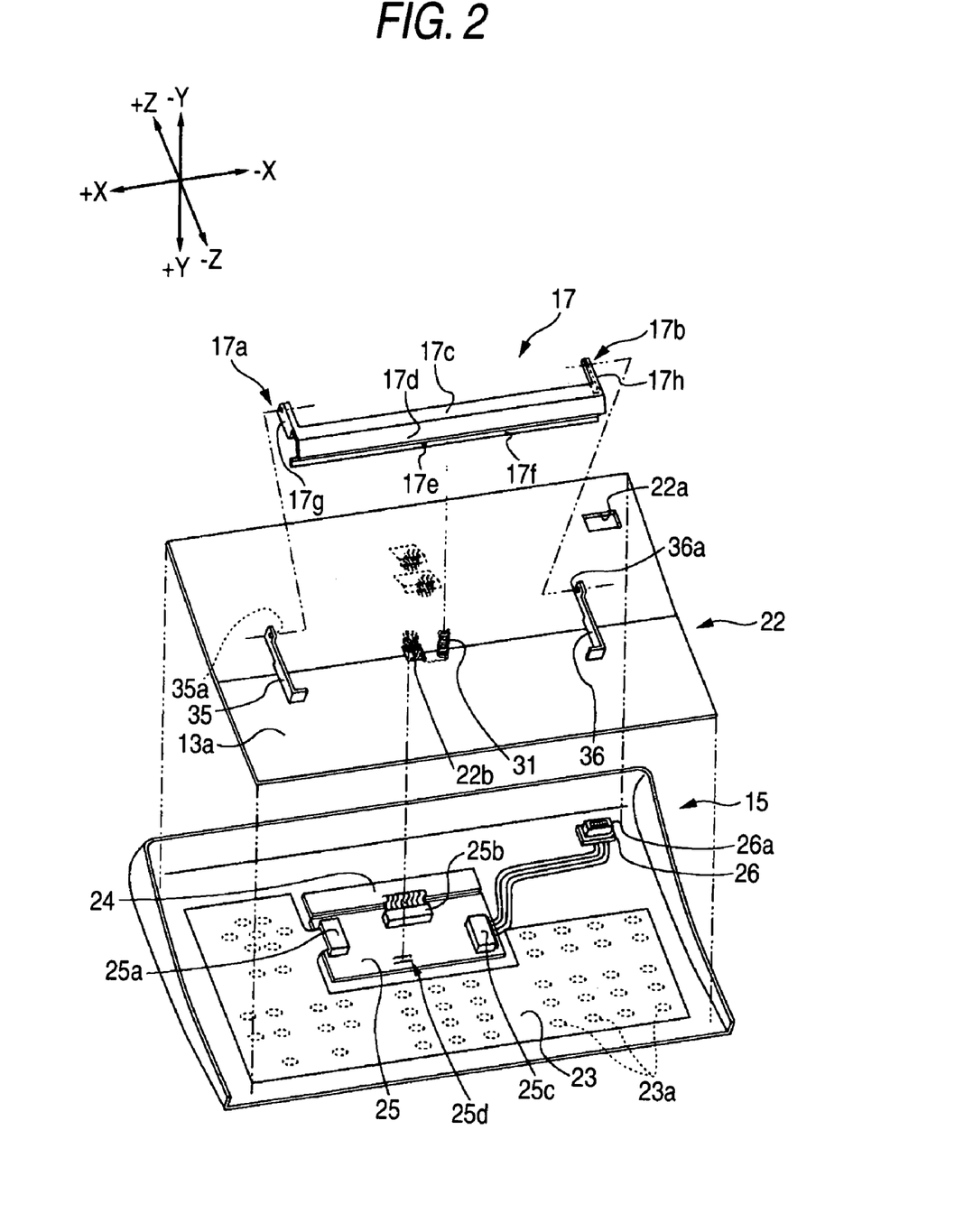
FIG. 2 is an exploded perspective view showing the internal structure of an operation panel.
Figure 3:
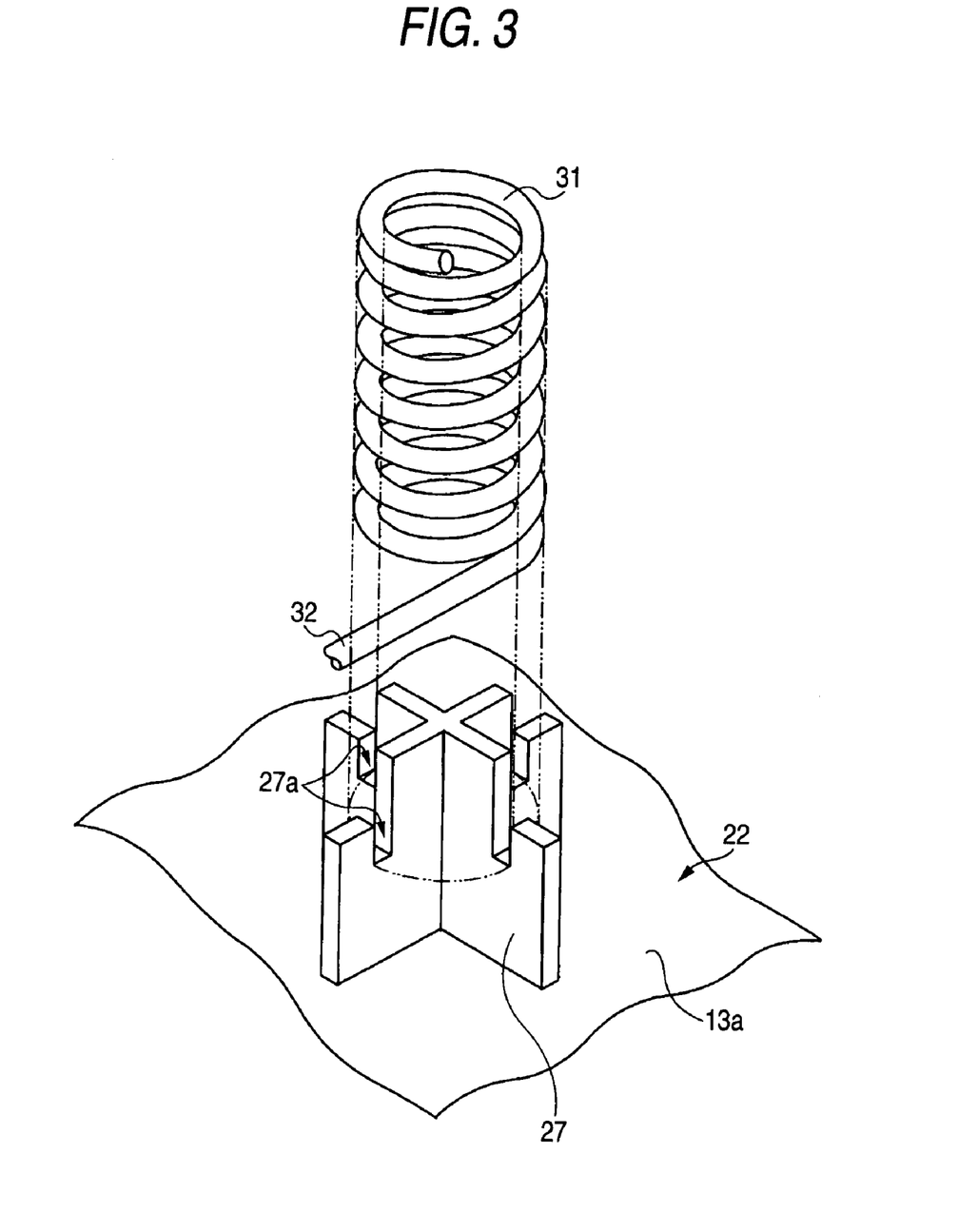
FIG. 3 is a perspective view of a spring and a holding portion that holds the spring.
Figure 4:
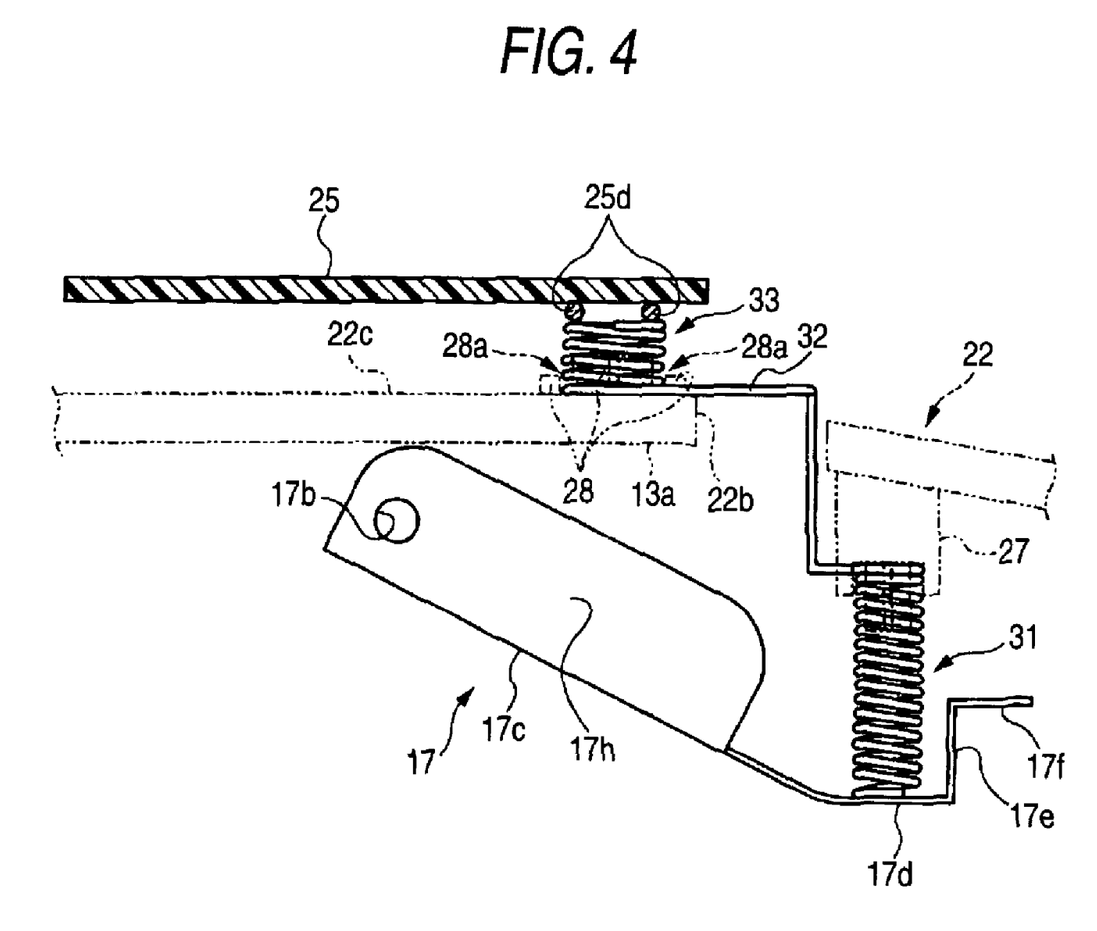
FIG. 4 is a view showing a connection for grounding a pressing plate through an electric circuit of a printed circuit board.

Next, the internal structure of the operation panel 15 will be described with reference to FIGS. 2 to 4. FIG. 2 is an exploded perspective view showing the internal structure of the operation panel 15, FIG. 3 is a perspective view of a spring 31 and a holding portion 27 which holds the spring, and FIG. 4 is a view showing a connection for grounding the pressing plate 17 through an electric circuit of a printed circuit board 25.

As shown in FIG. 2, when the operation panel 15 is detached and seen from the bottom side of the apparatus 1, the upper face 13a of the transport path 13 is exposed. The intermediate plate 22 constituting the upper face 13a of the transport path 13 is fixed to the operation panel 15 by screws or the like. Between the intermediate plate 22 and the operation panel 15, disposed are a flexible circuit board 23 and the printed circuit board 25 which detect an input exerted on the keys 15a of the operation panel 15, a display circuit board 24 which drives the LCD 15b, and an intermediate circuit board 26 in which a wiring connector 26a for connecting the circuit boards with a control circuit board (not shown) incorporated in the main unit of the apparatus 1 is disposed.

The keys 15a are disposed so as to be pressable from the outside of the operation panel 15 in the direction perpendicular to the operation face of the operation panel 15. A rubber-made cap (not shown) is disposed in the front end of each of the keys 15a. The cap butts against the flexible circuit board 23 disposed inside the operation panel 15, to give an urging force of restoring the pressed key 15a to the position before the pressing. An electrically conductive tip (not shown) is disposed inside the cap. Pairs of terminals 23a respectively corresponding to the tips of the keys 15a are disposed on the flexible circuit board 23. When the tip is in contact with the pair of terminals 23a, the terminals are connected to each other, and the input of the key 15a is detected. In the flexible circuit board 23, an electric circuit is printed on a film made of an insulator. In order to ensure an input of the keys 15a, pedestals are formed in positions of the intermediate plate 22 respectively corresponding to the terminals 23a of the flexible circuit board 23, so that the flexible circuit board 23 is prevented from being bent as a result of the pressing of the keys 15a. The terminals 23a functions as a detecting section.

The printed circuit board 25 is a circuit board having an electric circuit which detects the key 15a corresponding to the terminals that are made conductive by the flexible circuit board 23. Unlike the flexible circuit board 23, the printed circuit board is configured as a circuit board in which an electric circuit is printed on a hard board member. The flexible circuit board 23 is connected to a connector 25a which is disposed in an end portion of the printed circuit board. The printed circuit board 25 and the flexible circuit board 23 function as a circuit board member.

The display circuit board 24 controls the display on the LCD 15b. The LCD 15b is fixed to the circuit board. The display circuit board is fixed to the inside of the operation panel 15 so that the display screen of the LCD 15b is exposed to the outside of the operation panel 15. The display circuit board 24 is connected to a connector 25b which is disposed in an end portion of the printed circuit board 25.

The intermediate circuit board 26 is used for fixing the connector 26a which is to be connected with the control circuit board (not shown) of the apparatus 1, in a rear end corner portion of the operation panel 15. Conductors from the intermediate circuit board 26 are connected to a connector 25c of the printed circuit board 25. The intermediate circuit board 26 relays signals for transmitting input signals from the keys 15a of the operation panel 15 to the control circuit board, and transmitting a display control signal to the LCD 15b. In the intermediate plate 22, a wiring hole 22a through which conductors from the control circuit board to be connected to the connector 26a are passed is opened.

As described above, one face of the intermediate plate 22 is configured as the upper face 13a of the transport path 13. Fixing plates 35, 36 which have a plate-like shape, and which is used for fixing the pressing plate 17 protrude from the upper face 13a. The fixing plates 35, 36 are paired so that the pressing plate 17 which is supported at a substantially middle of the upper face 13a is supported in a direction (X-axis direction) perpendicular to the original transportation direction in the surface direction of the upper face 13a. The directions of the plate faces are substantially perpendicular to the upper face 13a, and in parallel with the original transportation direction. The longitudinal directions of the fixing plates 35, 36 coincide with the transportation direction.

In the fixing plates 35, 36, bosses 35a, 36a protrude from the upstream ends in the transportation direction so as to be opposed to each other. The bosses are engaged with support holes 17a, 17b opened in the side faces of the pressing plate 17, to support the pressing plate 17. The pressing plate 17 has: a plate face 17d formed by obtusely bending an end portion close to one end in the widthwise direction of the plate in which the lengthwise direction is perpendicular to the transportation direction; a plate face 17e formed by further perpendicularly bending in the bending direction at a position further closer to the end; and a plate face 17f formed by perpendicularly bending in an opposite direction in an end portion closest to the end (see FIG. 4). A plate face 17c which is close to the other end in the widthwise direction is largely cut away from the other end toward the one end, so that the plate face 17c has a U-like shape. The ends in the longitudinal direction of the U-shaped plate face 17c are configured as plate faces 17g, 17h formed by perpendicularly bending in the same direction as the plate face 17d. The support holes 17a, 17b are opened in end portions of the plate faces 17g, 17h close to the other end in the widthwise direction of the plate face 17c, respectively.

When the support holes 17a, 17b of the pressing plate 17 are engaged with the bosses 35a, 36a of the fixing plates 35, 36, the pressing plate 17 is swingably supported so that the plate face 17d is in contact with or separated from the CIS 14. In order to maintain the pressed state of the pressing plate 17 against the CIS 14, the spring 31 is disposed between the plate face 17d of the pressing plate 17 and the upper face 13a of the intermediate plate 22. The spring 31 is disposed so as to butt against a substantially middle portion in the longitudinal direction of the plate face 17d. A pressing force is uniformly applied to the pressing plate 17 in a direction perpendicular to the original transportation direction.

The spring 31 is a coil spring. As shown in FIG. 3, the holding portion 27 for positioning the spring 31 is disposed on the intermediate plate 22. The holding portion 27 has a shape which is formed by engaging two plates crosswise. Four recesses 27a are formed in the holding portion 27 so that, when the spring 31 is put on the holding portion, the cross center portion coincides with the center of the winding of the spring 31, whereby the spring can be held thereto. The recesses 27a are formed so that, when the spring 31 is held, the recess butts against the outer and inner peripheries of the spring 31 to clamp the spring, and cannot hold a spring of a different size. The holding portion 27 functions as a second holding portion.

As shown in FIG. 2, one end of the spring 31 on the side where the spring is held by the holding portion 27 is elongated so that the end extends through a through hole 22b formed in the vicinity of the holding portion 27, to a face 22c (see FIG. 4) of the intermediate plate 22 which is opposite to the upper face 13a. As shown in FIG. 4, a link portion 32 which is a portion elongated from the spring 31 passes through the through hole 22b of the intermediate plate 22 to reach above the face 22c of the intermediate plate 22. Another spring 33 which extends in a direction opposite to the spring 31 is formed with using the link portion as a basal portion. The spring 31, the link portion 32, and the spring 33 are formed by processing one steel wire which is electrically conductive. The spring 31, the link portion 32, and the spring 33 function as a conductive member. The spring 33 and the spring 31 function as a first elastic member and a second elastic member, and the link portion 32 functions as a link member.

The spring 33 is held by a holding portion 28 which is disposed on the face 22c of the intermediate plate 22, and which is structured in the same manner as the holding portion 27. The outer diameter of the spring 33 is larger than that of the spring 31. The length of the spring 33 in the expanding and contracting direction is shorter than that of the spring 31. In the same manner as described above, in order to hold the spring 33, recesses 28a of the holding portion 28 are formed so as to clamp the outer and inner peripheries of the spring 33. Therefore, the spring 31 which is different in outer diameter from the spring 33 cannot be held by the holding portion 28, and the spring 33 cannot be held by the holding portion 27. This is caused because of the following reason. In the recesses 28a, the portions which are to butt against the outer periphery of the spring 33 prevent a coil spring having an outer diameter which is larger than that of the spring 33, from being fitted into the recesses, and those which are to butt against the inner periphery prevent a coil spring having an outer diameter which is smaller than that of the spring 33, from being fitted into the recesses. This is applicable also to the holding portion 27. In steps of producing the apparatus 1, therefore, the conductive member configured by the spring 31, the link portion 32, and the spring 33 is hardly mounted in an erroneous mounting direction. The holding portion 28 functions as a first holding portion.

The elastic force of the spring 33 in the expanding and contracting direction is smaller than that of the spring 31 which is different in outer diameter and length. When the intermediate plate 22 is fixed to the operation panel 15 in the state where the spring 33 is held by the holding portion 28, the tip end of the spring 33 butts against the printed circuit board 25. A terminal wire 25d which is electrically connected to the electric circuit is disposed in a position of the printed circuit board 25 against which the spring 33 butts (see FIG. 2). The spring 31 must butt against the pressing plate 17 to apply the pressing force. By contrast, the spring 33 is requested only to exert an elastic force which can maintain the state where the spring is electrically connected through the terminal wire 25d to the electric circuit of the printed circuit board 25. Preferably, the elastic force has a magnitude which is not sufficient for exerting a pressing force that bends the printed circuit board 25. Therefore, the size of the outer diameter and the length of the spring 33 are different from those of the spring 31, so that the elastic force of the spring 33 is smaller than that of the spring 31. The terminal wire 25d functions as a contacting portion.

According to the configuration, the pressing plate 17 is electrically connected to the electric circuit of the printed circuit board 25 through the spring 31, the link portion 32, and the spring 33. As described above, the CIS 14 which is used in the image reading apparatus 10 of the apparatus 1 has a shallow depth of field, and hence the reading operation must be conducted while the original is in close contact with the reading position (the portion facing the transport path 13) of the CIS 14. The pressing plate 17 for causing the original to be in close contact with the CIS 14 is always in sliding contact with the original during a process of reading the original. Therefore, the pressing plate is charged as a result of the friction with the original.

The electric circuit of the printed circuit board 25 is electrically connected to a frame (not shown) of the apparatus 1 through the intermediate circuit board 26. Since the frame is grounded, the electric circuit of the printed circuit board 25 has a circuit portion in which the potential is equal to the ground potential. The terminal wire 25d is connected to the circuit portion, or grounded. Therefore, also the pressing plate 17 which is connected to the terminal wire 25d through the spring 31, the link portion 32, and the spring 33 is grounded. Consequently, charges which are generated by friction with the original are not accumulated in the pressing plate 17, but eliminated. According to the configuration, a trouble such as a failure in transportation of the original due to static electricity does not occur in the original which passes between the CIS 14 and the pressing plate 17.

As described above, in the apparatus 1, the pressing plate 17 which is charged by friction with the original is discharged through the conductive spring 31 which applies the pressing force to the pressing plate 17. In the spring 31 which is held by the holding portion 27 of the intermediate plate 22, the one end of the spring 31 on the side where the spring is held is elongated to the opposite face 22c through the link portion 32 and the through hole 22b of the intermediate plate 22. The spring 33 is formed in the elongated end portion. The spring 33 butts against the terminal wire 25d of the printed circuit board 25, and the terminal wire 25d is grounded through the electric circuit of the printed circuit board 25. Therefore, the pressing plate 17 is connected for grounding to the printed circuit board 25 through the spring 31, the link portion 32, and the spring 33. The grounding of the pressing plate 17 is conducted by the one part, and through the printed circuit board 25 in which a circuit portion for grounding is already disposed. Therefore, it is not required to dispose an additional part for grounding. The holding portion 27 which holds the spring 31 onto the intermediate plate 22, and the holding portion 28 which holds the spring 33 cannot hold the springs in a replaced manner, or the spring 33 and the spring 31, respectively. In the production steps, therefore, the springs are hardly mounted with an erroneous mounting direction.

It is a matter of course that the invention can be variously modified. The conductive member configured by the spring 31, the link portion 32, and the spring 33 is formed by a steel wire. Alternatively, the member may be formed by any material which is electrically conductive, tough, and elastic. The conductive member may be configured by one part which is produced by separately forming the spring 31, the link portion 32, and the spring 33 and then combining these parts. In any case, the link portion 32 may have at least a strength which enables the spring 31 and the spring 33 to be positioned, so that, when one of the coil springs is mounted on the holding portion in the process of mounting the conductive member to the intermediate plate 22, the other coil spring is placed in an appropriate position of the holding portion, whereby the mounting process can be facilitated.

The springs 31 and 33 are prevented from being erroneously mounted to the holding portions 27, 28, by differentiating the sizes of the outer diameters of the springs. Alternatively, the link portion 32 which is elongated from the spring 31 may pass the center position of the spring 31, and, in the holding portion 27, the position through which the link portion 32 passes when the spring 31 is held may be cut away so that interference with the link portion 32 does not occur. In the alternative, even when the springs 31 and 33 have the same outer diameter, the spring 31 cannot be mounted on the holding portion 28 in which a cutaway for allowing the link portion 32 to pass therethrough is not formed. Therefore, it is possible to prevent erroneous mounting from occurring.

The spring 33 butts against the terminal wire 25d disposed on the printed circuit board 25. Alternatively, the spring 33 may butt against the flexible circuit board 23. In the alternative, a pedestal or the like which prevents the flexible circuit board 23 from being bent may be disposed in a position opposite to the side of the flexible circuit board 23 against which the spring 33 butts.

In the embodiment, the multi-functional apparatus 1 has been described as an example. The configuration of the image reading apparatus of the embodiment can be adequately applied also to a copying apparatus which is not provided with a facsimile function. The image forming apparatus 50 may be an inkjet printer.

In the embodiment, the conductive member has a first elastic member 33 having elasticity, in a portion that is connected to the electric circuit.

Therefore, the conductive member can be connected to the electric circuit of the circuit board member by the elastic force of the first elastic member 33. Therefore, the contacting state between them can be kept to a satisfactory level, and the stable contacting state can be maintained, whereby the pressing member 17 can be surely discharged.

Further, the conductive member has a second elastic member 31 having elasticity, in a portion that is connected to the pressing member 17, and a pressing force which is applied by the pressing member 17 to press the medium to be read is given by the second elastic member 31.

Therefore, the second elastic member 31 for applying the pressing force of the pressing member 17 is used also for discharging the pressing member 17, so that the configuration for discharging the pressing member 17 can be omitted, and the production cost can be reduced.

In addition, the conductive member has: a first elastic member 33 having elasticity, in a portion that is connected to the electric circuit; and a second elastic member 31 having elasticity, in a portion that is connected to the pressing member; and the second elastic member 31 exerts a larger elastic force than an elastic force of the first elastic member 33.

Therefore, the first elastic member 31 which butts against the circuit board member is smaller in elastic force than the second elastic member 33. Thus, the load which is applied to the circuit board member by the pressing force can be reduced, and the circuit board member can be prevented from being bent.

Additionally, the conductive member has a link member 32 through which the first elastic member 33 is electrically connected to the second elastic member 31, and which positions the elastic members 33, 31.

Therefore, the first and second elastic members 33, 31 can be electrically connected to each other. Thus, the pressing member 17 can be electrically connected to the electric circuit of the circuit board member through the sequence of the second elastic member 31, the link member 32, and the first elastic member 33, so that the number of parts for discharging can be reduced, and the production cost can be reduced.

Also, the first elastic member 33, the second elastic member 31, and the link member 32 are formed integrally with each other by the same material.

Therefore, the first elastic member 33, the link member 32, and the second elastic member 31 are integrally formed. Thus, the electrical connection between the circuit board member and the pressing member 17 can be conducted by one member, so that the number of parts for discharging can be reduced, and the production cost can be lowered.

Moreover, the first elastic member 33 and the second elastic member 31 are coil springs, and a diameter of the first elastic member 33 is larger than a diameter of the second elastic member 31.

Therefore, the first and second elastic members 33, 31 have different diameters. Thus, the elastic forces of the first and second elastic members 33, 31 which are made of the same material can be easily differentiated from each other.

Further, the cover member has: a first holding portion 28 that holds the first elastic member 33; and a second holding portion 27 that holds the second elastic member 31; and the first holding portion 28 cannot hold the second elastic member 31, or the second holding portion 27 cannot hold the first elastic member 33.

Therefore, during the process of mounting the conductive member, the conductive member cannot be mounted in an erroneous mounting direction. Thus, mounting in an erroneous direction is not conducted, so that the production loss can be reduced, and the production cost can be lowered.

Also, the cover member has a button that is depressable from a side that is not opposed to the transport path; and the circuit board member has a detecting section which, when the button is depressed, detects a depressed state.

Therefore, the circuit board member is used for detecting the depressed state of the button which is disposed on the cover member, and the pressing member 17 can be grounded with using the grounding portion of the electric circuit.

Additionally, the circuit board member has: a printed circuit board made of a hard material, the printed circuit board having a contacting portion with which the elastic member is contacted to ground the pressing member; and a flexible circuit board connected to the printed circuit board, the flexible circuit board being made of a material that is softer than the material of the printed circuit board, the flexible circuit board having the detecting section.

Therefore, the first elastic member 33 is in contact with the hard portion of the circuit board member. Even when a pressing force is applied by the first elastic member 33, therefore, the circuit board member is hardly bent, and hence the circuit board member can be prevented from being broken.

Further, the multi-functional apparatus 1 has: the image reading apparatus 10; and an image forming apparatus 58 that forms an image read by the image reading apparatus, on a medium to be recorded.

Therefore, it is possible to provide a multi-functional apparatus 1 in which the production process can be simplified and the production cost can be lowered.

The invention can be applied to an image reading apparatus, a copying apparatus having an image reading apparatus, a facsimile apparatus, or a multi-functional apparatus having such apparatuses.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. An image reading apparatus comprising:
    a transport path through which a medium to be read is transported;
    an image reading section disposed in a middle of the transport path and reading an image formed on the medium to be read that is transported along the transport path;
    a cover member that covers the image reading section and the transport path;
    a pressing member that is pivotably supported on the cover member, thereby applying a pressing force to the transported medium to be read such that the transported medium to be read is pressed against the image reading section;
    a circuit board member which is disposed on the cover member, and on which a grounded electric circuit is formed; and
    a conductive member having a first spring disposed in a portion that is connected to the pressing member, the conductive member electrically connecting the pressing member to the electric circuit formed on the circuit board member through the first spring in order to ground the pressing member through the electric circuit;
    wherein the first spring supplies the pressing force that is applied to the pressing member to press the transported medium to be read.

2. The image reading apparatus according to claim 1, wherein the conductive member comprises a second spring, in a portion that is connected to the electric circuit.

3. The image reading apparatus according to claim 2, wherein:
    the first spring exerts a larger elastic force than an elastic force of the second spring.

4. The image reading apparatus according to claim 3, wherein the conductive member comprises a link member through which the first spring is electrically connected to the second spring, and which positions the first spring and the second spring.

5. The image reading apparatus according to claim 4, wherein the first spring, the second spring, and the link member are formed integrally with each other by the same material.

6. The image reading apparatus according to claim 5, wherein the first spring and the second spring are coil springs, and a diameter of the second spring is larger than a diameter of the first spring.

7. The image reading apparatus according to claim 6, wherein the cover member comprises:
    a first holding portion that holds the first spring; and
    a second holding portion that holds the second spring;
    wherein the first holding portion does not hold the second spring, or the second holding portion cannot hold the first spring.

8. The image reading apparatus according claim 1, wherein:
    the cover member comprises a button that is depressable from a side that is not opposed to the transport path; and
    the circuit board member comprises a detecting section which, when the button is depressed, detects a depressed state.

9. The image reading apparatus according to claim 8, wherein the circuit board member comprises:
    a printed circuit board made of a hard material, the printed circuit board having a contacting portion with which the first spring is contacted via the second spring to ground the pressing member; and
    a flexible circuit board connected to the printed circuit board, the flexible circuit board being made of a material that is softer than the material of the printed circuit board, the flexible circuit board having the detecting section.

10. The image reading apparatus according to claim 1, wherein the pressing member comprises:
    a first surface that contacts the transported medium to be read; and
    a second surface that is opposite the first surface and that is connected to the first spring.

11. A multi-functional apparatus comprising:
    an image reading apparatus including:
        a transport path through which a medium to be read is transported;
        an image reading section disposed in a middle of the transport path and reading an image formed on the medium to be read that is transported along the transport path;
        a cover member that covers the image reading section and the transport path;
        a pressing member that is pivotably supported on the cover member, thereby applying a pressing force to the transported medium to be read such that the transported medium to be read is pressed against the image reading section;
        a circuit board member which is disposed on the cover member, and on which a grounded electric circuit is formed; and
        a conductive member having a first spring disposed in a portion that is connected to the pressing member, the conductive member electrically connecting the pressing member to the electric circuit formed on the circuit board member through the first spring in order to ground the pressing member through the electric circuit; and
    an image forming apparatus that forms an image read by the image reading apparatus, on a medium to be recorded;
    wherein the first spring supplies the pressing force that is applied to the pressing member to press the transported medium to be read.

12. A multi-functional apparatus comprising:
    an image reading apparatus including:
        a transport path through which a medium to be read is transported;
        an image reading section disposed in a middle of the transport path and reading an image formed on the medium to be read that is transported along the transport path;
        a cover member that covers the image reading section and the transport path;
        a pressing member in which a first portion thereof is pivotably supported on the cover member, thereby causing a second portion thereof to apply a pressing force to, the transported medium to be read such that the transported medium to be read is pressed against the image reading section, the second portion being located at a downstream side in a transporting direction of the medium to be read of the first portion;

a circuit board member which is disposed on the cover member, and on which a grounded electric circuit is formed;

a conductive member having a first spring disposed in a portion that is connected to the pressing member, the conductive member electrically connecting the pressing member to the electric circuit formed on the circuit board member through the first spring in order to ground the pressing member through the electric circuit; and an image forming apparatus that forms an image read by the image reading apparatus, on a medium to be recorded;

wherein the first spring supplies the pressing force that is applied to the second portion to press the transported medium to be read.

13. The multi-functional apparatus according to claim 12, wherein the cover member comprises:

an operation panel; and an intermediate plate disposed at an inner face side of the operation panel;

the circuit board member is arranged between the operation panel and the intermediate plate; and the conductive member penetrates the intermediate plate.

14. The multi-functional apparatus according to claim 13, wherein the conductive member comprises:

a second spring, in a portion that is connected to the electric circuit;

a link member through which the first spring is electrically connected to the second spring;

the first spring exerts a larger elastic force than an elastic force of the second spring;

the first spring, the second spring, and the link member are formed integrally with each other by the same material; and a diameter of the second spring is larger than a diameter of the first spring.

* * * * *